United States Patent
Goller et al.

(10) Patent No.: US 7,730,616 B2
(45) Date of Patent: Jun. 8, 2010

(54) METHODS TO FACILITATE COOLING SYNGAS IN A GASIFIER

(75) Inventors: George Albert Goller, Greenville, SC (US); Daniel Anthony Nowak, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/616,850

(22) Filed: Nov. 12, 2009

(65) Prior Publication Data

US 2010/0050521 A1 Mar. 4, 2010

Related U.S. Application Data

(62) Division of application No. 11/624,924, filed on Jan. 19, 2007, now Pat. No. 7,670,574.

(51) Int. Cl.
B21D 53/02 (2006.01)
(52) U.S. Cl. .................. 29/890.03; 422/198; 422/200; 48/77; 48/95; 48/100; 48/101; 48/127.9; 165/172; 165/157; 165/145; 165/171; 29/890.032; 29/890.038; 29/890.051
(58) Field of Classification Search .............. 48/77, 48/95, 100, 101, 127.9; 165/172, 157, 145; 165/171
See application file for complete search history.

(56) References Cited

U.S. PATENT DOCUMENTS

| | | | | |
|---|---|---|---|---|
| 2,179,638 A | * | 11/1939 | Koppers | 48/67 |
| 2,804,284 A | * | 8/1957 | Otten | 165/166 |
| 4,272,255 A | * | 6/1981 | Coates | 48/63 |
| 4,395,268 A | * | 7/1983 | Zabelka | 48/67 |
| 4,836,274 A | * | 6/1989 | Firth et al. | 165/11.1 |
| 5,117,623 A | | 6/1992 | Arundale | |
| 5,243,922 A | | 9/1993 | Rehmat et al. | |
| 5,248,316 A | * | 9/1993 | Peise et al. | 48/76 |
| 5,445,658 A | * | 8/1995 | Durrfeld et al. | 48/62 R |
| 5,688,296 A | | 11/1997 | Andrus, Jr. et al. | |
| 5,713,312 A | * | 2/1998 | Waryasz | 122/481 |
| 5,715,671 A | | 2/1998 | Griffiths | |
| 5,803,937 A | * | 9/1998 | Hartermann et al. | 48/210 |
| 6,061,936 A | | 5/2000 | Jahnke | |
| 6,216,436 B1 | | 4/2001 | Ranasinghe et al. | |
| 6,615,748 B2 | * | 9/2003 | Sunter et al. | 110/233 |
| 6,824,575 B1 | | 11/2004 | Otomo et al. | |
| 6,874,572 B2 | * | 4/2005 | Wanni et al. | 165/172 |
| 6,923,004 B2 | | 8/2005 | Chandran et al. | |
| 6,941,879 B2 | * | 9/2005 | Hahn et al. | 110/341 |
| 2003/0056439 A1 | * | 3/2003 | Wilhelm et al. | 48/127.9 |

* cited by examiner

*Primary Examiner*—Alexa D. Neckel
*Assistant Examiner*—Kaity V. Handal
(74) *Attorney, Agent, or Firm*—Armstron Teasdale LLP

(57) ABSTRACT

A method of cooling syngas in a gasifier is provided. The method includes channeling cooling fluid through at least one tube-bundle that includes at least three tubes coupled together within a radiant syngas cooler and extends through a reaction zone of the gasifier, and circulating reactant fluid around the at least one tube-bundle to facilitate transferring heat from the reactant fluid to the cooling fluid.

11 Claims, 4 Drawing Sheets

METHODS TO FACILITATE COOLING SYNGAS IN A GASIFIER

CROSS-REFERENCE TO RELATED APPLICATIONS

This application is a divisional of U.S. patent application Ser. No. 11/624,924, filed Jan. 19, 2007 now U.S. Pat. No. 7,670,574, which is hereby incorporated by reference and is assigned to the assignee of the present invention.

BACKGROUND OF THE INVENTION

This invention relates generally to integrated gasification combined-cycle (IGCC) power generation systems, and more specifically to a gasifier that includes an integral radiant syngas cooler.

At least some known IGCC systems include a gasification system that is integrated with at least one power-producing turbine system. For example, known gasifiers convert a mixture of fuel, air or oxygen, steam, and/or limestone into an output of partially combusted gas, sometimes referred to as "syngas". The hot combustion gases are supplied to the combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides electrical power to the power grid.

At least some know gasification systems use a separate gasifier, and a physically-large radiant cooler to gasify bottoms, recover heat, and to remove solids from the syngas, to make the syngas useable by other systems. Such additional components and ancillary equipment needed to support operation of the gasifier and the radiant cooler add to the complexity, the capital expense, and operational manpower of the system.

BRIEF DESCRIPTION OF THE INVENTION

In one embodiment, a method of cooling syngas in a gasifier is provided. The method includes channeling cooling fluid through at least one tube-bundle that includes at least three tubes coupled together within a radiant syngas cooler and extends through a reaction zone of the gasifier, and circulating reactant fluid around the at least one tube-bundle to facilitate transferring heat from the reactant fluid to the cooling fluid.

In a further embodiment, a radiant cooler for use in a gasifier is provided. The cooler includes at least one cooling tube-bundle comprising at least three cooling tubes, and at least two connection members. A first of the connection members is coupled between a first and a second of the at least three cooling tubes. A second of the connection members is coupled between a third of the at least three cooling tubes and the first connection member. A portion of the first connection member mates substantially flush against a portion of the second connection member.

In a further embodiment, a gasifier is provided. The gasifier includes a reaction zone, and a radiant cooler extending through the reaction zone. The radiant cooler includes at least one cooling tube-bundle comprising at least three cooling tubes, and at least two connection members. A first of the connection members is coupled between a first and a second of the at least three cooling tubes. A second of the connection members is coupled between a third of the at least three cooling tubes and the first connection member. A portion of the first connection member mates substantially flush against a portion of the second connection member.

DETAILED DESCRIPTION OF THE INVENTION

Figure 1:
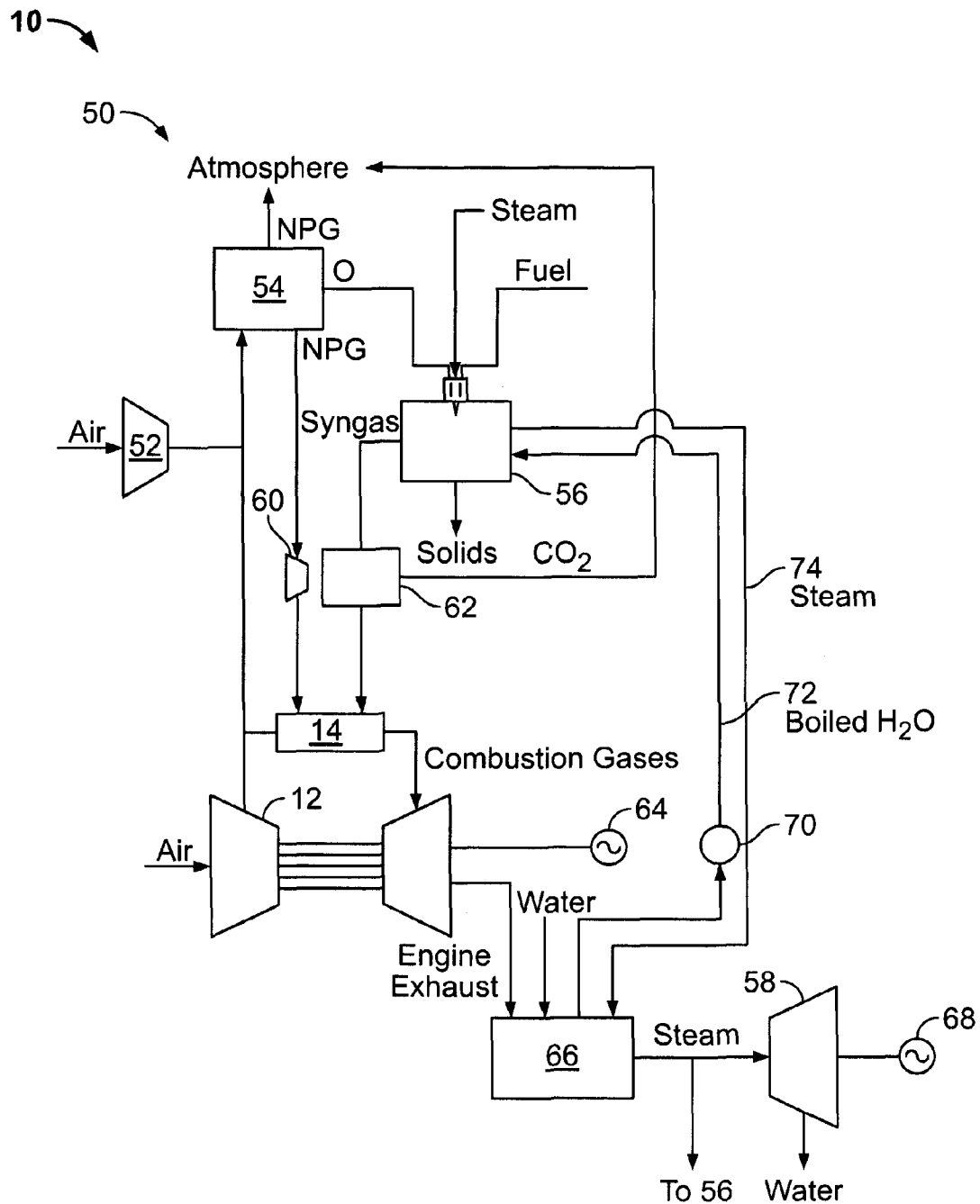
FIG. 1 is a schematic diagram of an exemplary known integrated gasification combined-cycle (IGCC) power generation system.

FIG. 1 is a schematic diagram of an exemplary known integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58.

In operation, compressor 52 compresses ambient air that is channeled to air separation unit 54. In some embodiments, in addition to compressor 52 or alternatively, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen ($O_2$) and a gas by-product, sometimes referred to as a "process gas". The process gas generated by air separation unit 54 includes nitrogen and will be referred to herein as "nitrogen process gas" (NPG). The NPG may also include other gases such as, but not limited to, oxygen and/or argon. For example, in some embodiments, the NPG includes between about 95% and about 100% nitrogen. The $O_2$ flow is channeled to gasifier 56 for use in generating partially combusted gases, referred to herein as "syngas" for use by gas turbine engine 10 as fuel, as described below in more detail. In some known IGCC systems 50, at least some of the NPG flow is vented to the atmosphere from air separation unit 54. Moreover, in some known IGCC systems 50, some of the NPG flow is injected into a combustion zone (not shown) within gas turbine engine combustor 14 to facilitate controlling emissions of engine 10, and more specifically to facilitate reducing the combustion temperature and reducing nitrous oxide emissions from engine 10. In the exemplary embodiment, IGCC system 50 includes a compressor 60 for compressing the nitrogen process gas flow before being injected into the combustion zone.

Gasifier 56 converts a mixture of fuel, $O_2$ supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. In the exemplary embodiment, syngas generated by gasifier 56 is cleaned in a clean-up device 62 before being channeled to gas turbine engine combustor 14 for combustion thereof. Carbon dioxide ($CO_2$) may be separated from the syngas during clean-up and, in some known IGCC systems 50, may be vented to the atmosphere. Gas turbine engine 10 drives a generator 64 that supplies electrical power to a power grid (not shown). Exhaust gases from gas turbine engine 10 are channeled to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 56 for generating syngas.

Furthermore, in the exemplary embodiment, system 50 includes a pump 70 that supplies steam 74 from steam generator 66 to a radiant syngas cooler (not shown) within gasifier 56 to facilitate cooling the syngas flowing within gasifier 56. Steam 74 is channeled through the radiant syngas cooler wherein water 72 is converted to steam 74. Steam 74 is then returned to steam generator 66 for use within gasifier 56 or steam turbine 58.

Figure 2:
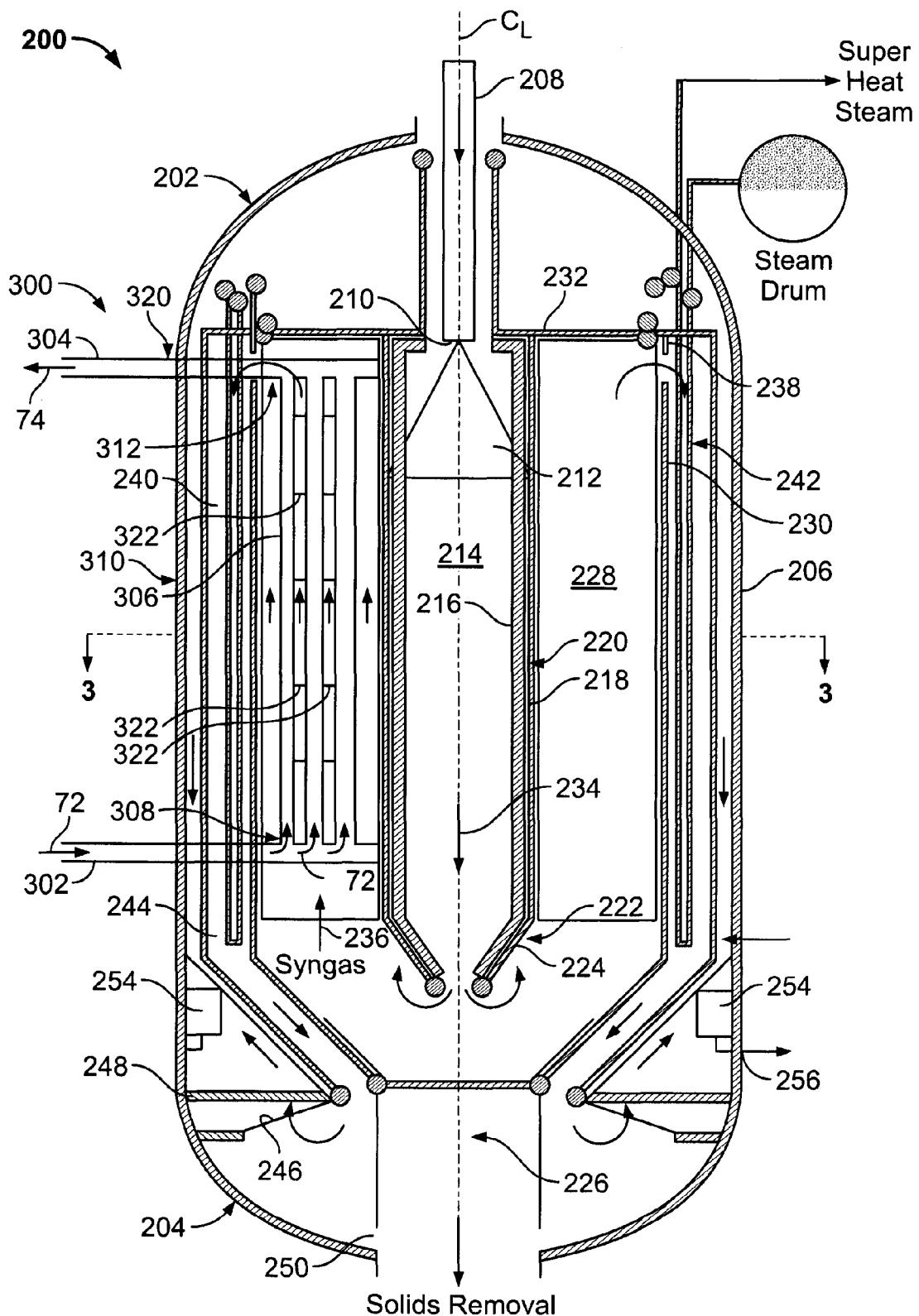
FIG. 2 is a schematic view of an exemplary gasifier that includes an integral radiant syngas cooler and that may be used with the system shown in FIG. 1.

FIG. 2 is a schematic view of an exemplary advanced solids removal gasifier 200 that includes an integral radiant syngas cooler 300. Gasifier 200 may be used with an IGCC, such as system 50 (shown in FIG. 1). In the exemplary embodiment, gasifier 200 includes an upper shell 202, a lower shell 204, and a substantially cylindrical vessel body 206 extending therebetween. A feed injector 208 penetrates upper shell 202 to enable a flow of fuel to be channeled into gasifier 200. More specifically, the fuel flowing through injector 208 is routed through one or more passages defined in feed injector 208 and is discharged through a nozzle 210 in a predetermined pattern 212 into a combustion zone 214 defined in gasifier 200. The fuel may be mixed with other substances prior to entering nozzle 210, and/or may be mixed with other substances when discharged from nozzle 210. For example, the fuel may be mixed with fines recovered from a process of system 50 prior to entering nozzle 210 and/or the fuel may be mixed with an oxidant, such as air or oxygen, at nozzle 210 or downstream from nozzle 210.

In the exemplary embodiment, combustion zone 214 is defined as a vertically-oriented, generally cylindrical space, that is substantially co-aligned with nozzle 210 in a serial flow communication. An outer periphery of combustion zone 214 is defined by a refractory wall 216 that includes a structural substrate, such as an Incoloy pipe 218 and a refractory coating 220 that substantially resists the effects of high temperatures and high pressures contained within combustion zone 214. In the exemplary embodiment, an outlet end 222 of refractory wall 216 includes a convergent outlet nozzle 224 that facilitates maintaining a predetermined backpressure in combustion zone 214, while permitting products of combustion and syngas generated in combustion zone 214 to exit combustion zone 214. The products of combustion may include gaseous byproducts, slag formed generally on refractory coating 220, and/or fine particular matter carried in suspension with the gaseous byproducts.

After exiting combustion zone 214, flowable slag and solid slag are gravity-fed into a lockhopper 226 coupled to lower shell 204. Lockhopper 226 is maintained with a level of water that quenches the flowable slag into a brittle solid material that may be broken into smaller pieces when removed from gasifier 200. In the exemplary embodiment, lockhopper 226 captures approximately ninety percent of fine particulate exiting combustion zone 214.

In the exemplary embodiment, a first annular passage 228 at least partially surrounds combustion zone 214. Passage 228 is partially defined by refractory wall 216 at an inner periphery, and by a cylindrical shell 230 that is substantially coaxially aligned with combustion zone 214 at a radially outer periphery of passage 228. Passage 228 is sealed at the top by an upper flange 232. The gaseous byproducts and any remaining fine particulate are channeled from a downward direction 234 in combustion zone 214 to an upward direction 236 in passage 228. The rapid redirection at outlet nozzle 224 facilitates separating fine particulate and slag separation from gaseous byproducts.

The gaseous byproducts and any remaining fine particulate are channeled upward through passage 228 to an outlet 238. As the gaseous byproducts are channeled through passage 228, heat may be recovered from the gaseous byproducts and the fine particulate. For example, in one embodiment, the gaseous byproducts enter passage 228 at a temperature of approximately 2500° Fahrenheit and exit passage 228 at a temperature of approximately 1800° Fahrenheit. The gaseous byproducts and fine particulates are discharged from passage 228 through outlet 238 and are channeled into a second annular passage 240 wherein the gaseous byproducts and fine particulates are redirected to a downward flow direction 241. As gaseous byproducts and fine particulates flow through passage 240, heat may be recovered using for example, superheat tubes 242 that transfer heat from the flow of gaseous byproducts and the fine particulates to steam flowing through superheat tubes 242. For example, in one embodiment, the gaseous byproducts enter passage 240 at a temperature of approximately 1800° Fahrenheit and exit passage 240 at a temperature of approximately 1500° Fahrenheit.

When the flow of gaseous byproducts and the fine particulates reach a bottom end 244 of passage 240, passage 240 converges toward lockhopper 226. More specifically, at bottom end 244, the flow of gaseous byproducts and the fine particulates is channeled upward through a water spray 246 that desuperheats the flow of gaseous byproducts and the fine particulates. Heat removed from the flow of gaseous byproducts and the fine particulates tends to vaporize water spray 246 and agglomerate the fine particulates such that the fine particulates form a relatively larger ash clod that falls into lower shell 204. The flow of gaseous byproducts and the remaining fine particulates are channeled in a reverse direction towards a perforated plate 248 that circumscribes bottom end 244. A level of water is maintained above perforated plate 248 to facilitate removing additional fine particulate from the flow of gaseous byproducts. As the flow of gaseous byproducts and the remaining fine particulates percolate through perforated plate 248, fine particulates contained in the flow are entrapped in the water and carried through the perforations into a sump formed in lower shell 204. A gap 250 defined between lockhopper 226 and lower shell 204 enables the fine particulates to flow into lockhopper 226 wherein the fine particulates are facilitated to be removed from gasifier 200.

An entrainment separator 254 encircles an upper end of lower shell 204. More specifically, separator 254 is above perforated plate 248 and above the level of water covering perforated plate 248. Entrainment separator 254 may be for example, a cyclonic or centrifugal separator that includes a tangential inlet or turning vanes that impart a swirling motion to the gaseous byproducts and the remaining fine particulates flowing therethrough. The particulates are thrown outward by centrifugal force to the walls of separator 254 wherein the fine particulates coalesce and are gravity-fed to the separator lower shell 204. Additionally, any remaining fine particulates impact a mesh pad, agglomerate with other particulates and are flushed to lower shell 204.

Alternatively, entrainment separator 254 can be of a blade type, such as a chevron separator or an impingement separator. In a chevron separator, the gaseous byproducts pass between blades and are forced to travel in a tortuous or zigzag pattern. The entrained particulates and any liquid droplets cannot follow the gas streamlines, and impinge against the blade surfaces prior to coalescing, wherein the particulates are gravity-fed into lower shell 204. Features such as hooks and pockets, can be added to the sides of the blades to facilitate improving particulate and liquid droplet capture. In addition, chevron grids can be stacked to provide a series of separation stages. Similarly, impingement separators create a cyclonic motion as gaseous byproducts and fine particulates pass over curved blades. A spinning motion is imparted that causes the entrained particulates and any liquid droplets to be forced against to the vessel walls, wherein the entrained particulates and any liquid droplets may be collected in lower shell 204.

The flow of gaseous byproducts and any remaining fine particulates enter separator 254 wherein substantially all of any remaining entrained particulate and/or liquid droplets are removed form the flow of gaseous byproducts. The flow of gaseous byproducts exits gasifier 200 through an outlet 256 for further processing.

In the exemplary embodiment, gasifier 200 also includes a radiant syngas cooler 300 that is coupled within passage 228. Moreover, in one embodiment, cooler 300 includes a plurality of platens 320 spaced circumferentially about a centerline CL of cylindrical vessel 206. Each platen 320 extends radially outward from refractory wall 216 towards vessel body 206, and is positioned within passage 228 to facilitate cooling syngas flowing through passage 228. Moreover, each platen 320 includes an inlet 302, an outlet 304, and a plurality of cooling tubes 306 extending therebetween. In the exemplary embodiment, each platen 320 includes approximately 12 cooling tubes 306. In an alternative embodiment, each platen 320 includes any suitable number of cooling tubes 306 that facilitate cooling the syngas in passage 228. In the exemplary embodiment, cooling tubes 306 form a plurality of tube-bundles. A tube-bundle includes a plurality of cooling tubes 306 coupled to one another with connection members such that the cooling tubes are positioned in various configurations, as will be described in more detail below.

In the exemplary embodiment, inlet 302 extends from a first end 308 of cooling tube 306 to an exterior 310 of cylindrical vessel 206. Similarly, outlet 304 extends from a second end 312 of cooling tube 306 to exterior 310. In the exemplary embodiment, inlet 302 is positioned below outlet 304. In an alternative embodiment, inlet 302 is positioned above outlet 304 or substantially planar therewith.

During operation, pump 70 channels steam 74 from steam generator 66 through inlet 302 and into cooling tube first end 308. Alternatively, steam 74 may be channeled to inlet 302 from any suitable source. Steam 74 is then channeled through cooling tube 306 towards second end 312. Simultaneously, syngas channeled through passage 228 flows around cooling tube 306 to facilitate a heat exchange between the syngas and steam 74. Specifically, because steam 74 has a temperature that is less than the temperature of the syngas, steam 74 absorbs heat from the syngas to facilitate cooling the syngas.

Furthermore, in addition to cooling the syngas, cooling tube 306 facilitates cooling of refractory wall 216. More specifically, as steam 74 absorbs heat from the syngas, a higher temperature steam 74 is produced in cooling tube 306 and is discharged through outlet 304. In the exemplary embodiment, steam 74 is discharged from outlet 304 to steam generator 66 for further use within system 50. In an alternative embodiment, steam 74 is channeled to any suitable portion of system 50 and/or any other system that requires steam. In another alternative embodiment, steam 74 is discharged from system 50 to the atmosphere.

Figure 3:
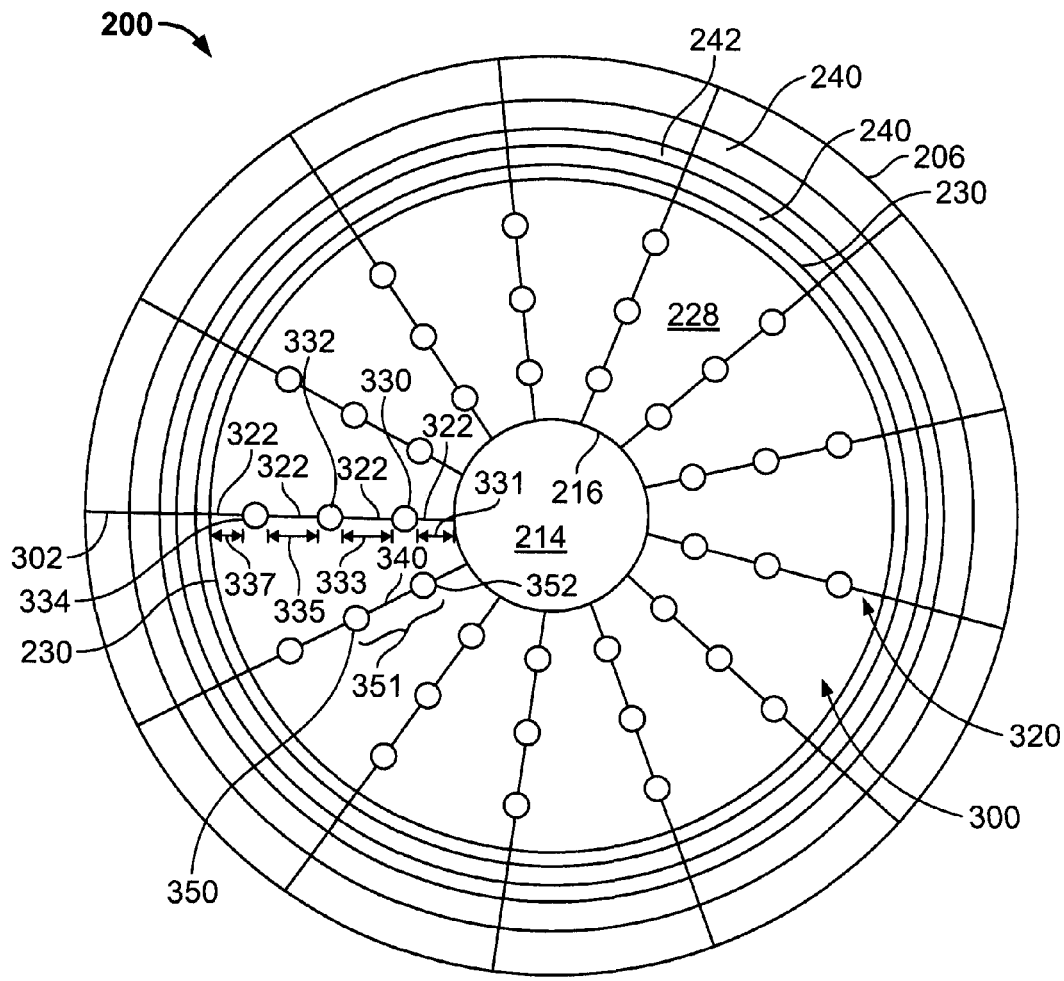
FIG. 3 is a cross-sectional view of an exemplary gasifier shown in FIG. 2.
Figure 4:
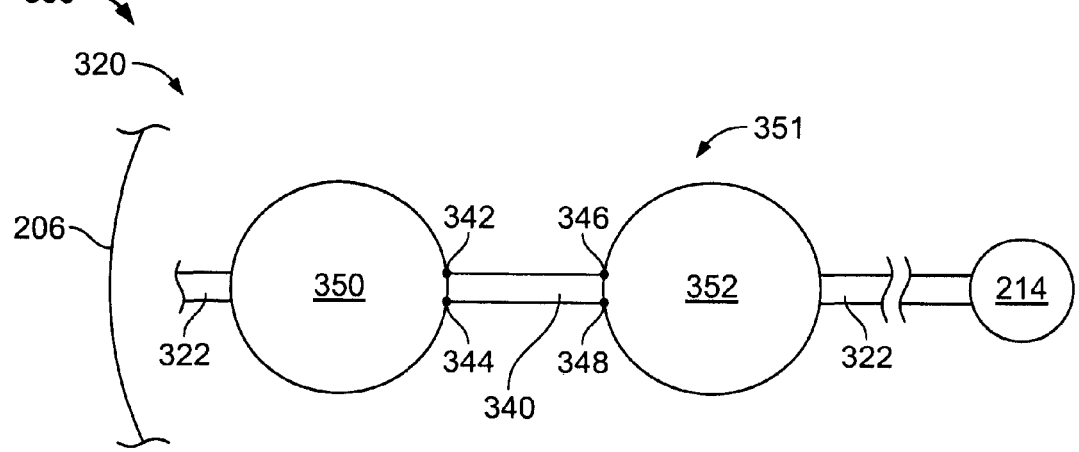
FIG. 4 is an enlarged plan view of a portion of an integral radiant syngas cooler that may be used with an exemplary gasifier shown in FIG. 2.

FIG. 3 is a cross-sectional view of gasifier 200 taken along line 3-3 (shown in FIG. 2). FIG. 4 is an enlarged plan view of a portion of integral radiant syngas cooler 300.

In the exemplary embodiment, cooler 300 includes a plurality of platens 320. Each platen 320 is positioned within passage 228 and extends substantially radially outward from refractory wall 216 towards vessel body 206. Cooling tubes 306 are coupled together by a plurality of connection members 322 (shown in FIG. 2) to facilitate cooling syngas flowing through passage 228. In the exemplary embodiment, cooler 300 includes thirteen platens 320. In an alternative embodiment, cooler 300 includes any number of platens 320 that enables gasifier 200 to function as described herein.

In the exemplary embodiment, platens 320 are positioned circumferentially around combustion zone 214. More specifically, in the exemplary embodiment, platens 320 are spaced substantially equally about gasifier 200. Accordingly, in the exemplary embodiment, each platen 320 is spaced approximately 27.69 degrees apart from each circumferentially-adjacent platen 320. In an alternative embodiment, cooler 300 includes fifteen platens 320, and platens 320 are spaced approximately 24 degrees apart from each other. In another alternative embodiment, platens 320 are not circumferentially equi-spaced about combustion zone 214.

In the exemplary embodiment, each platen 320 includes at least three cooling tubes 306. In an alternative embodiment, each platen 320 includes any number of cooling tubes 306 that enable the syngas in passage 228 to be cooled, as described herein. Specifically, in the exemplary embodiment, a first platen cooling tube 330 is located a distance 331 radially outward from refractory wall 216 and is coupled to refractory wall 216 with at least one connection member 322. A second platen cooling tube 332 is located a distance 333 radially outward from cooling tube 330. In the exemplary embodiment, distance 333 is approximately the same as distance 331. At least one connection member 322 secures cooling tube 332 to cooling tube 330. A third platen cooling tube 334 is located a distance 335 radially outward from cooling tube 332. In the exemplary embodiment, distance 335 is approximately the same as distance 331, such that cooling tubes 330 and 334 are substantially equi-spaced from cooling tube 332. Alternatively, distance 335 is different than distance 331. At least one connection member 322 couples cooling tube 334 to cooling tube 332. Moreover, in the exemplary embodiment, cooling tube 334 is coupled to second passage 240 with at least one connection member 322, such that tube 334 is a distance 337 radially inward from passage 228.

Figure 5:
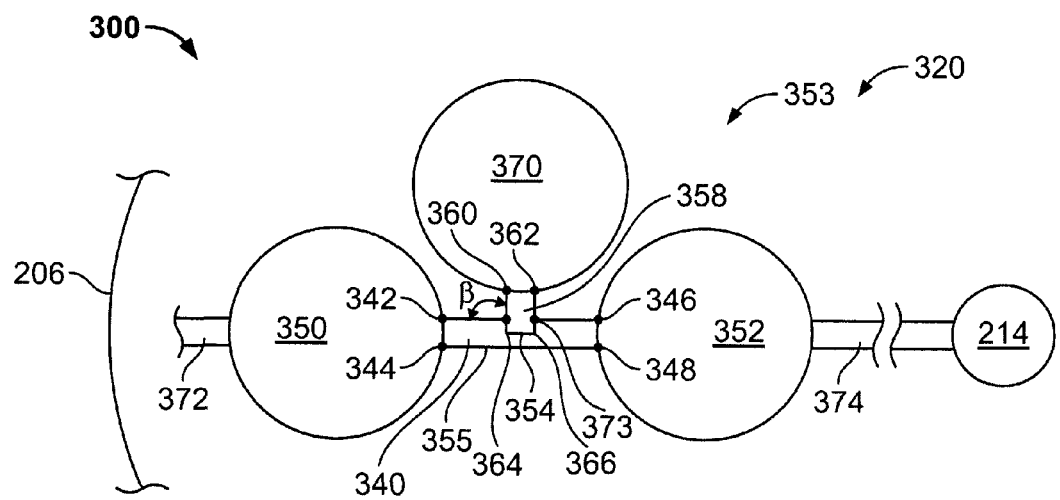
FIG. 5 is an enlarged plan view a portion of an alternative embodiment of an integral radiant syngas cooler that may be used with an exemplary gasifier shown in FIG. 2.
Figure 6:
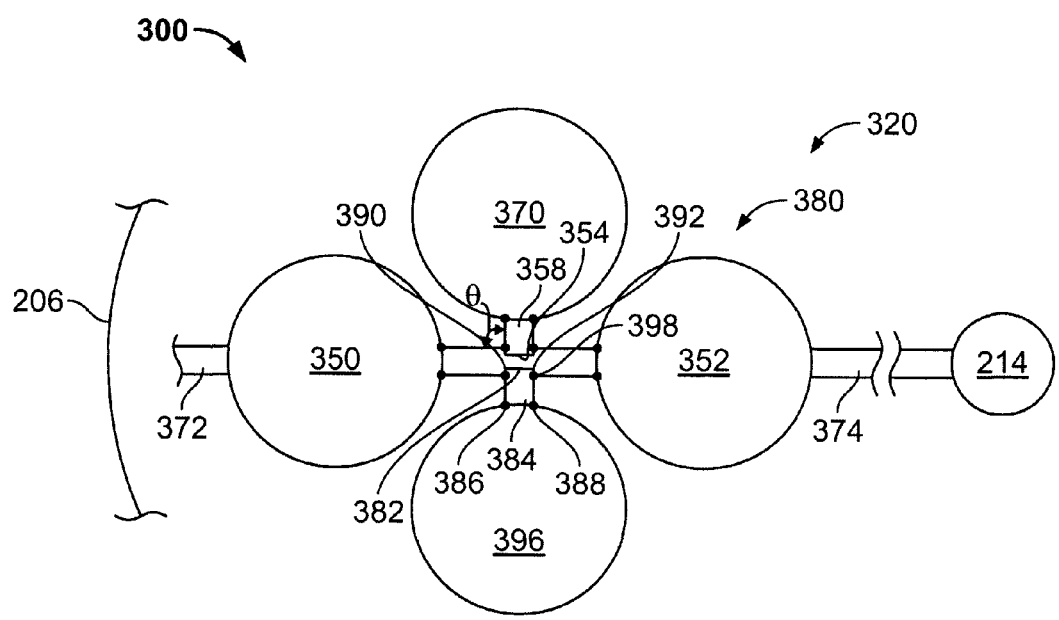
FIG. 6 is an enlarged plan view of a portion of another alternative embodiment of an integral radiant syngas cooler that may be used with an exemplary gasifier shown in FIG. 2.

FIG. 5 is an enlarged plan view a portion of an alternative embodiment of an integral radiant syngas cooler 300 that may be used with gasifier 200 (shown in FIG. 3). FIG. 6 is an enlarged plan view of a portion of another alternative embodiment of a radiant syngas cooler 300 that may be used with gasifier 200 (shown in FIG. 3).

In one embodiment, for example, two cooling tubes 350 and 352 are coupled together with a connection member 340 (shown in FIG. 4) that extends therebetween such that a two-tube-bundle 351 is created. In the exemplary embodiment, connection member 340 includes at least four connection interfaces 342, 344, 346, and 348. Each connection interface 342, 344, 346, and 348 is defined between a portion of a cooling tube and connection member 340. In the exemplary embodiment, cooling tubes 350 and 352 are coupled substantially conlinearly together.

During assembly, connection interfaces 342 and 344 are created against cooling tube 350, and connection interfaces 346 and 348 are created against cooling tube 352. Specifically, connection interfaces 342 and 344 are created as member 340 is welded to cooling tube 350, and connection interfaces 346 and 348 are created as member 340 is welded to cooling tube 352. In an alternative embodiment, member 340 is coupled to cooling tubes 350 and 352 with any other suitable method.

In an alternative embodiment, as shown in FIG. 5, for example, three cooling tubes 306 are coupled together with two connection members 340 and 358 such that a three-tube-bundle 353 is created. Connection members 340 and 358 are coupled together in a mating connection. Specifically, a notch 354 is formed on member 340 prior to member 340 being coupled to cooling tubes 350 and 352. More specifically, notch 354 is shaped, sized, and oriented to receive a second connection member 358 therein.

In the exemplary embodiment, second connection member 358 includes connection interfaces 360, 362, 364, and 366. Second connection member 358 is configured to mate with notch 354 such that notch 354 is configured to receive second connection member therein.

During assembly of three-tube-bundle 353, in the exemplary embodiment, for example, connection interfaces 342 and 344 are created as member 340 is coupled to cooling tube 350, and connection interfaces 346 and 348 are created as connection member 340 is coupled to cooling tube 352. As second connection member 358 is coupled to a third cooling tube 370, connection interfaces 360 and 362 are created. Moreover, connection interfaces 364 and 366 are coupled within notch 354. More specifically, when member 358 is positioned substantially flush within notch 354, a joint 373 is defined between connection interfaces 364 and 366, and connection member 340. In the exemplary embodiment, members 340 and 358 are welded together. In an alternative embodiment, connection members 340 and 358 are not welded together, but rather are coupled together with any suitable method of coupling. In the exemplary embodiment, member 358 is oriented at an angle β with respect to member 340. In the exemplary embodiment, angle β is approximately 90°. Coupling cooling tubes 350, 352, and 370 together with at least two connection members 340 and 358 facilitates increasing the surface area of each platen 320 such that cooling of syngas within passage 228 is facilitated to be increased. For example, in the exemplary embodiment, the surface area of each platen 320 is increased approximately thirty to forty percent with the use of a three-tube-bundle as compared to a two-tube-bundle.

In the exemplary embodiment, three-tube-bundle 353 is coupled to other portions of gasifier 200 with connection members 322. For example, three-tube-bundle 353 may be coupled to, but is not limited to being coupled to, other three-tube-bundles, at least one two-tube-bundle, a four-tube-bundle (described below), a single cooling tube, refractory wall 216, and/or passage 228. Specifically, for example, tube-bundle 353 includes a pair of connection members 372 and 374 that each extend from opposite sides of bundle 353 and that are each oriented substantially collinearly with connection member 340. In an alternative embodiment, cooling tubes 350 and 352 each include a plurality of connection members 322 that extend outward from other locations which facilitate coupling multiple cooling tubes 306 together.

In an alternative, as shown in FIG. 6, for example, four cooling tubes 306 are coupled together with three connection members 340, 358, and 384 such that a four-tube-bundle 380 is formed. Connection members 340, 358, and 384 are coupled together in a mating configuration. Specifically, at least two notches 354 and 382 are formed on member 340 prior to being coupled to cooling tubes 350 and 352. More specifically, notches 354 and 382 are shaped, sized, and oriented to receive second connection members 358 and 384, respectively, therein. In the exemplary embodiment, notches 354 and 382 have substantially the same shape.

In the exemplary embodiment, second connection member 358 includes connection interfaces 360, 362, 364, and 366. Similarly, in the exemplary embodiment, third connection member 384 includes connection interfaces 386, 388, 390, and 392. Second connection member 358 is configured to mate with notch 354, and third connection member 384 is configured to mate with notch 382. Notch 354 is configured to receive second connection member 358 therein, and notch 382 is configured to receive third connection member 384 therein.

During assembly of four-tube-bundle 380, in the exemplary embodiment, for example, connection interfaces 342 and 344 are created as member 340 is coupled to cooling tube 350, and connection interfaces 346 and 348 are created as member 340 is coupled to cooling tube 352. As second member 358 is coupled to third cooling tube 370, connection interfaces 360 and 362 are created. Moreover, connection interfaces 364 and 366 are created within notch 354. More specifically, when member 358 is positioned substantially flush within notch 354, joint 373 is defined between connection interfaces 364 and 366, and member 340. In the exemplary embodiment, members 340 and 358 are welded together. In an alternative embodiment, members 340 and 358 are not welded together, but rather are coupled together with any other suitable method of coupling.

Similarly, during assembly, as third member 384 is coupled to fourth cooling tube 396, connection interfaces 386 and 388 are created. Moreover, connection interfaces 390 and 392 are created within notch 382. More specifically, when third member 384 is positioned substantially flush within notch 382, a joint 398 is defined between connection interfaces 390 and 392, and member 340. In the exemplary embodiment, members 340, 358, and 384 are welded together. In an alternative embodiment, members 340, 358, and 384 are not welded together, but rather are coupled together with any other suitable method of coupling. In the exemplary embodiment, member 358 is oriented at an angle β with respect to member 340. In the exemplary embodiment, angle β is approximately 90°. In the exemplary embodiment, member 384 is oriented at an angle θ with respect to member 340. In the exemplary embodiment, angle θ is approximately 90°.

Coupling cooling tubes 350, 352, 370, and 396 together with at least three connection members 340, 358, and 384 facilitates increasing the surface area of each platen 320 such that cooling of syngas within passage 228 is facilitated to be increased. For example, in the exemplary embodiment, the surface area of each platen 320 is increased approximately seventy percent with the use of a four-tube-bundle as compared to a two-tube-bundle.

In the exemplary embodiment, four-tube-bundle 380 is coupled to other portions of gasifier 200 with connection members 322. For example, four-tube-bundle 380 may be coupled to, but is not limited to being coupled to, other four-tube-bundles, at least one two-tube-bundle, a three-tubebundle, a single cooling tube, refractory wall 216, and/or passage 228. Specifically, for example, cooling tube-bundle 380 includes a pair of connection members 372 and 374 that each extend from opposite sides of bundle 380 and that are each oriented substantially collinearly with connection member 340. In an alternative embodiment, cooling tubes 350 and 352 each include a plurality of connection members 322 that extend outward from other locations which facilitate coupling multiple cooling tubes 306 together.

During operation, in the exemplary embodiment, steam 74 is channeled through the tube-bundles, as described above, to facilitate cooling syngas flowing through passage 228 of gasifier 200. In an alternative embodiment, any suitable cooling fluid is channeled through tube-bundles. Simultaneously, syngas flowing through passage 228 is directed around the tube-bundles. As the syngas is circulated around the tube-bundles, heat transfer occurs between steam 74 and the syngas. Specifically, steam 74 absorbs heat from the syngas. The use of tube-bundles increases the surface area of the platens while not increasing the number of platens within passage 228.

In one embodiment, a method of cooling syngas in a gasifier is provided. The method includes channeling cooling fluid through at least one tube-bundle that includes at least three tubes coupled together within a radiant syngas cooler and extends through a reaction zone of the gasifier, and circulating reactant fluid around the at least one tube-bundle to facilitate transferring heat from the reactant fluid to the cooling fluid.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

The above-described methods and systems facilitate circulating syngas through cooling tubes coupled within a gasifier. As such, cooling of syngas in the integrated gasification system is facilitated to be improved without increasing the number of components within the IGCC. As a result, costs associated with the operation and maintenance of the IGCC are facilitated to be reduced, while the efficiency of the IGCC is enhanced.

Exemplary embodiments of gasification systems and methods of incorporating a radiant syngas cooler into a gasifier to cool the syngas within the gasifier are described above in detail. The gasification system components illustrated are not limited to the specific embodiments described herein, but rather, components of each system may be utilized independently and separately from other components described herein. For example, the gasification system components described above may also be used in combination with different IGCC system components.

While the invention has been described in terms of various specific embodiments, those skilled in the art will recognize that the invention can be practiced with modification within the spirit and scope of the claims.

What is claimed is:

1. A method for assembling a radiant cooler for use in a gasifier, said method comprising:
    providing at least one cooling tube-bundle including a first cooling tube, a second cooling tube, and a third cooling tube;
    coupling a first connection member between the first and second cooling tubes; and
    coupling a second connection member between the third cooling tube and the first connection member, wherein a portion of the first connection member mates substantially flush against a portion of the second connection member.

2. A method in accordance with claim 1 wherein providing at least one cooling tube-bundle further comprises providing at least one cooling tube-bundle to facilitate increasing a surface area of the radiant cooler.

3. A method in accordance with claim 1 wherein coupling a first connection member further comprises welding the first connection member to the first and second cooling tubes, and wherein coupling a second connection member further comprises welding the second connection member to the third cooling tube and to the first connection member.

4. A method in accordance with claim 1 further comprising receiving a portion of the second connection member within a notch of the first connection member.

5. A method in accordance with claim 1 further comprising orienting the second connection member substantially perpendicularly with respect to the first connection member.

6. A method for assembling a gasifier, said method comprising:
    providing a radiant cooler including at least one cooling tube-bundle and at least two connection members, wherein the at least one cooling tube-bundle includes a first cooling tube, a second cooling tube, and a third cooling tube;
    coupling the first connection member between the first and second cooling tubes;
    coupling the second connection member between the third cooling tube and the first connection member, wherein a portion of the first connection member mates substantially flush against a portion of the second connection member;
    providing a reaction zone; and
    extending the radiant cooler through the reaction zone.

7. A method in accordance with claim 6 further comprising positioning a combustion zone radially inward from the reaction zone, wherein the at least one cooling tube-bundle extends between the combustion zone and an outer wall of the gasifier.

8. A method in accordance with claim 6 wherein providing a radiant cooler further comprises providing a radiant cooler including at least one cooling tube-bundle to facilitate increasing a surface area of the radiant cooler.

9. A method in accordance with claim 6 wherein coupling the first connection member further comprises welding the first connection member to the first and second cooling tubes, and wherein coupling the second connection member further comprises welding the second connection member to the third cooling tube and to the first connection member.

10. A method in accordance with claim 6 further comprising receiving a portion of the second connection member within a notch of the first connection member.

11. A method in accordance with claim 6 further comprising orienting the second connection member substantially perpendicularly with respect to the first connection member.

* * * * *